April 14, 1970 W. J. BERLEYOUNG 3,506,510
METHOD OF SONIC WELDING
Filed Sept. 18, 1967 3 Sheets-Sheet 1
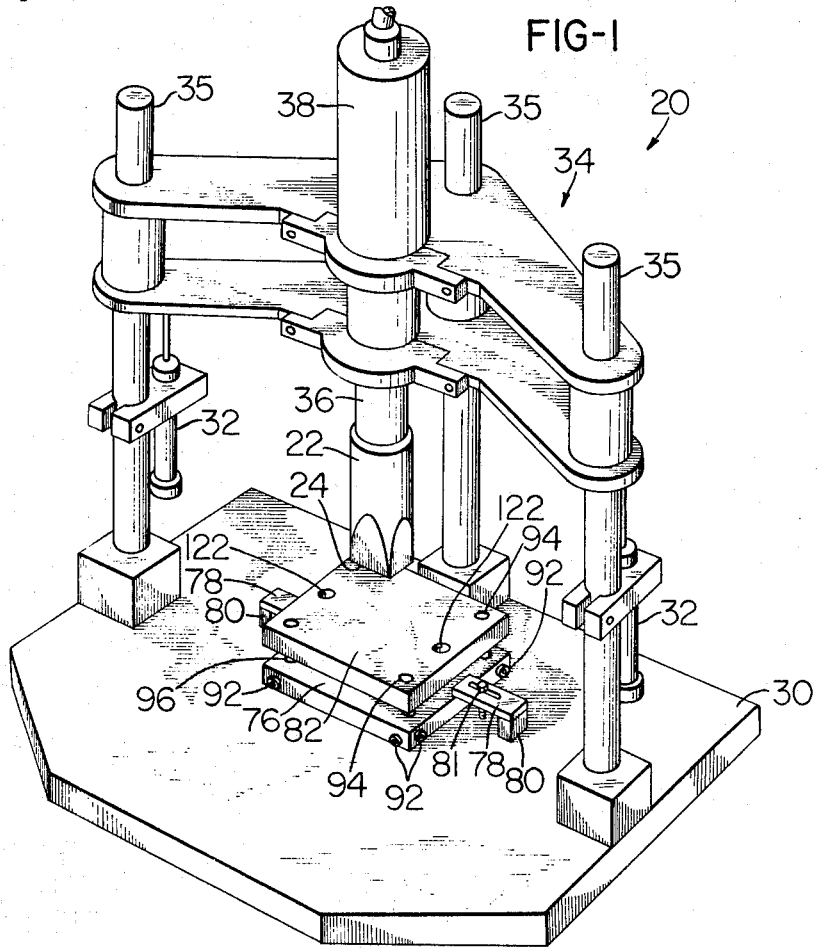
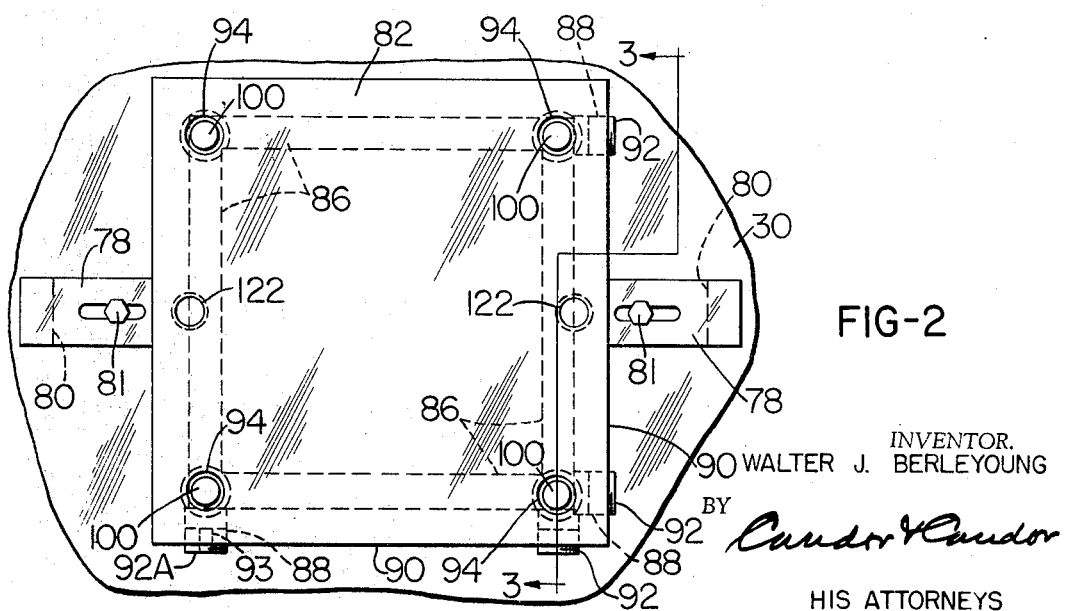
INVENTOR.
WALTER J. BERLEYOUNG
BY Candor & Candor
HIS ATTORNEYS

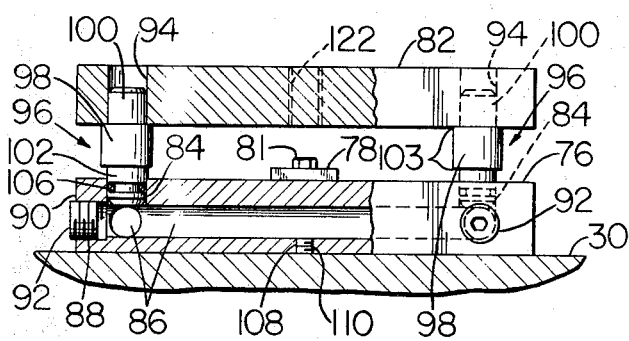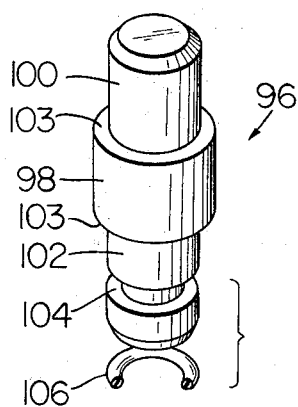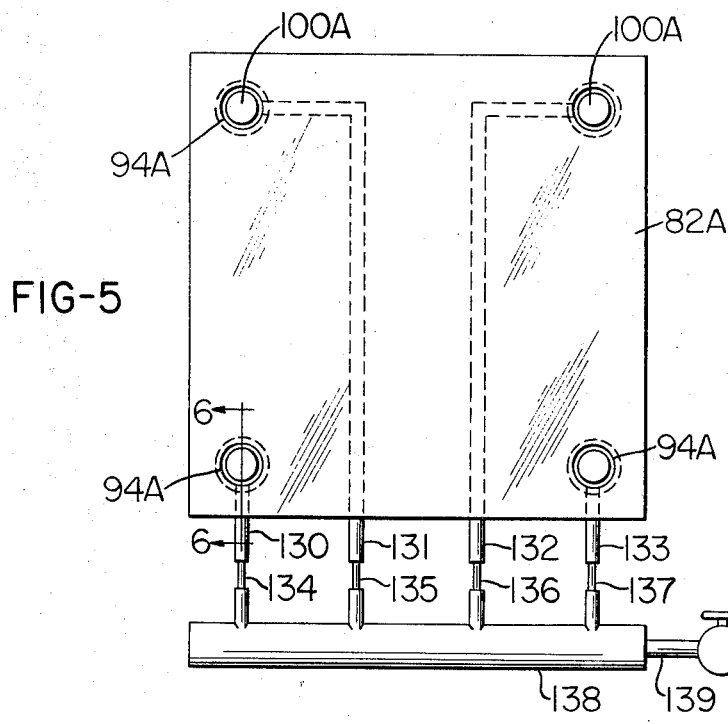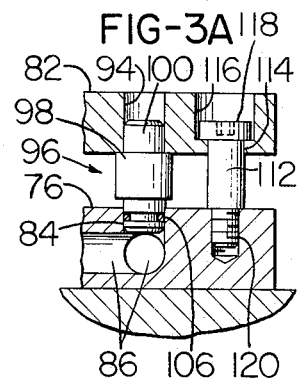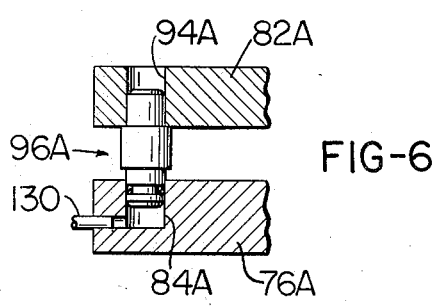

April 14, 1970     W. J. BERLEYOUNG     3,506,510
METHOD OF SONIC WELDING
Filed Sept. 18, 1967     3 Sheets-Sheet 3
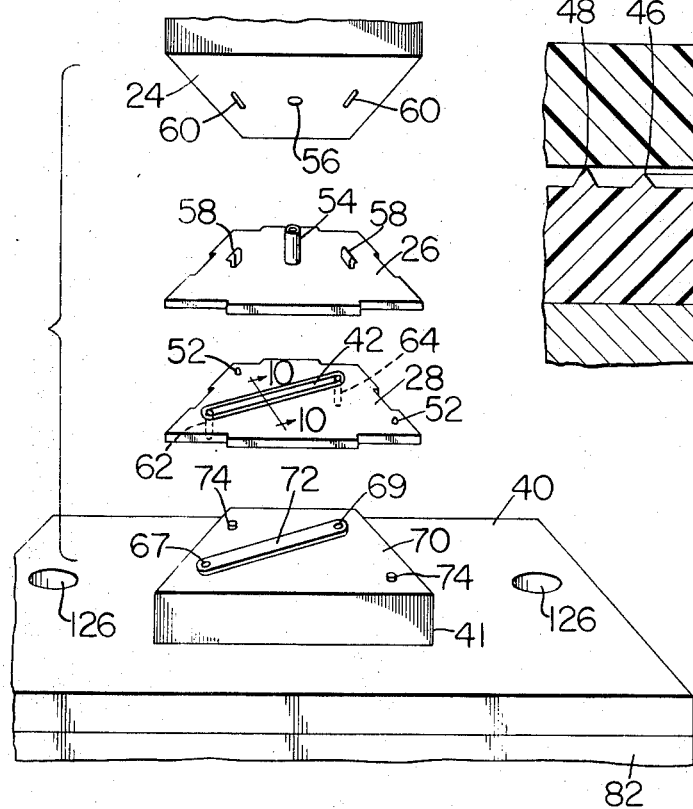
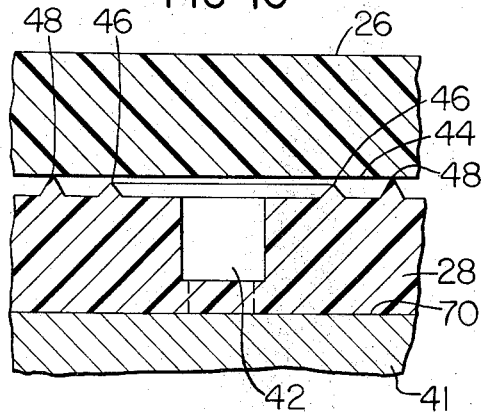
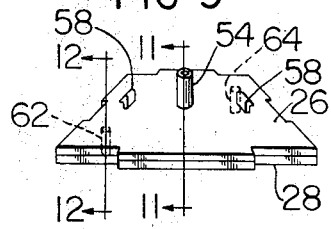
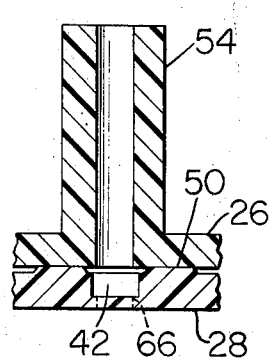
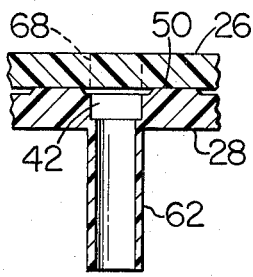
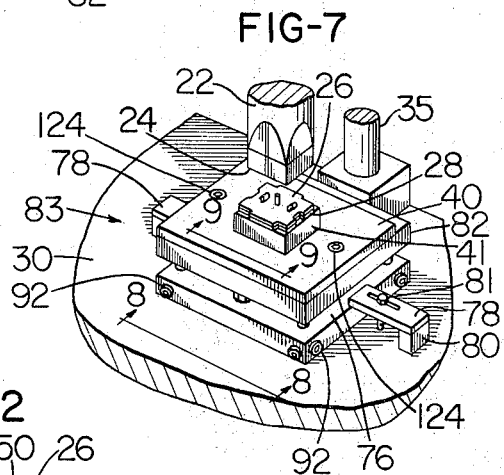
*INVENTOR.*
WALTER J. BERLEYOUNG
BY
HIS ATTORNEYS

United States Patent Office 3,506,510
Patented Apr. 14, 1970

---

3,506,510
METHOD OF SONIC WELDING
Walter J. Berleyoung, Goshen, Ind., assignor to Robertshaw Controls Company, Richmond, Va., a corporation of Delaware
Continuation-in-part of application Ser. No. 643,716, June 5, 1967. This application Sept. 18, 1967, Ser. No. 668,508
Int. Cl. B32b 31/16; B29c 27/02
U.S. Cl. 156—73
4 Claims

ABSTRACT OF THE DISCLOSURE

The application discloses an apparatus and method for sonically welding a plurality of thermoplastic members or flat plates. A sonic signal producing element or horn presses and imparts welding sonic signals to one of the thermoplastic members. A holding fixture holds one or more of such thermoplastic members. A base plate supports the holding fixture, and fluid action supporting means are provided between the holding fixture and the base plate. Such fluid action supporting means may include a plurality of fluid actuated plungers to support said fixture. This construction equally distributes the main part of the force of the horn over the entire surface of the parts of the thermoplastic members to be welded together.

---

This application is a continuation-in-part of copending application Ser. No. 643,716, filed June 5, 1967, for self-adjusting apparatus and method for sonic welding.

This invention relates to a fluid action support means and method for sonic welding.

One of the features of this invention includes sonic welding apparatus and method for sonically welding a plurality of thermoplastic members or relatively flat plates by means of a signal producing element which imparts welding sonic signals to one of such members or flat plates, a holding fixture to hold one or more of such members or flat plates, and fluid action support means automatically to distribute a main part of the force of said sonic signals to the parts of said members or flat plates to be sonically welded together. Such automatic means may include fluid action support means for said holding fixture automatically to distribute a main part of the force of said sonic signals to the parts of said thermoplastic members or flat plates to be sonically welded together.

Another feature of this invention includes a base member or base plate having fluid flow means.

Another feature of this invention includes fluid plunger means between said holding fixture and said base member or base plate.

Other features of this invention are apparent from this description, the appended claimed subject matter and/or the accompanying drawings, in which:

FIGURE 1 is a perspective view of a sonic welding apparatus for welding and performing a method of sonically welding various parts of a plurality of thermoplastic members or flat plates.

FIGURE 2 is an enlarged top plan view of a portion of FIGURE 1.

FIGURE 3 is a vertical cross section, partly in elevation, taken along the line 3—3 of FIGURE 2.

FIGURE 3A is a vertical cross section of a feature that may be added.

FIGURE 4 is a perspective exploded view of one of the fluid actuated plungers.

FIGURE 5 is a plan view somewhat similar to FIGURE 2, but showing another embodiment.

FIGURE 6 is a vertical cross section along line 6—6 of FIGURE 5.

FIGURE 7 is a view of part of FIGURE 1 with a welding support die and a plurality of thermoplastic plates mounted on the holding fixture rocker plate.

FIGURE 8 is an enlarged exploded perspective view of part of FIGURE 7 taken generally from line 8—8 of FIGURE 7.

FIGURE 9 is an enlarged perspective view of the thermoplastic plates taken generally from line 9—9 of FIGURE 7.

FIGURE 10 is an enlarged cross section through the typical plates of FIGURE 8, substantially along the line 10—10, and showing the two plates closely together before any welding action has taken place.

FIGURE 11 is an enlarged diagrammatic cross section along the line 11—11 of FIGURE 9.

FIGURE 12 is an enlarged diagrammatic cross section along the line 12—12 of FIGURE 9.

Certain words may be used in this specification and claimed subject matter which indicate direction, relative position, and the like. These words are used for the sake of brevity and clearness. However, it is to be understood that such words are used only in connection with the various views of the drawings, and that, in actual use, the parts so described, may have entirely different direction, relative position, and the like. Examples of such words are "vertical," "horizontal," "upper," "lower," etc.

FIGURE 1 shows a sonic welding apparatus 20 which may be used for sonically welding a plurality of thermoplastic members or flat plates according to this invention. This apparatus 20 may be quickly adjusted to operate on a large number of different banks or assemblies of a plurality of thermoplastic members or flat plates. Such apparatus 20 is adapted sonically to weld quickly a plurality of thermoplastic members or flat plates to form a plurality of identical banks or assemblies of such thermoplastic members or plates, or sonically to weld a plurality of thermoplastic members or plates into a plurality of entirely different banks or assemblies, as desired.

For example, it may be desired repeatedly to weld a plurality of members or plates to form a plurality of identical banks or assemblies of such members or plates relatively quickly. This apparatus 20 quickly adjusts itself, so that such members or plates are quickly received and quickly sonically welded together to form such identical banks or assemblies of welded flat members or plates. On the other hand, it may be desired to produce a plurality of different banks or assemblies of such flat members or plates, in which case the apparatus may be quickly modified or adjusted repeatedly to produce such different banks or assemblies of flat members or plates in a manner more fully to be disclosed.

The apparatus 20 may include a signal producing element or horn 22 having means 24 to press and impart welding sonic signals to one thermoplastic member or plate 26 of a plurality of relatively flat members or plates 26, 28, and the like, to weld certain parts of the plates 26 and 28 together.

Certain parts of the apparatus 20 may be purchased, for example, from Branson Instruments, Inc., which has a place of business at Danbury, Conn., or from some other similar supplier of such equipment. Such purchased apparatus 20 may then be modified to have the form and operaiton of this invention.

The parts of the apparatus 20 which may be purchased or obtained from such suppliers may include a stand or pedestal 30 which supports the sonic welding horn 22, so that such horn may be moved vertically by suitable hydraulic or pneumatic cylinders 32 which raise and lower a supporting platfrom construction 34 on posts 35. The platform 34 carries a horn supporting shaft 36, a sonic power unit 38, which may be connected to a power supply unit, not shown, but well known.

The horn 22 is readily secured to and readily removed from the shaft 36. The horn 22 may be tailored by the supplier in accordance with the design or request of the user to match the article to be contacted. To operate on the plates 26 and 28 such horn may be provided with a relatively large contact area under surface or face 24 which is adapted to engage a large area of the upper plate 26 when the horn 22 is lowered into sonic welding position. The plurality, or pair of plates 26 and 28, are placed together on top of the welding support die 40, FIGURES 7 and 8, which die has a raised portion 41, and then the horn is brought into welding engagement with the top of the plate 26, and sonic signals are produced in and by the horn 22 to produce the sonic welding operation to be described.

The words "sonic" and "ultrasonic" and derivatives thereof are intended to be used interchangeably herein to describe vibrations of the character suitable for performing the welding operation of this invention. For example, typical frequencies may have a range of from 4,000 to 20,000 vibrations per second, more or less.

The thermoplastic members or flat plates, such as 26 and 28, herein disclosed, are merely illustrative of the many different kinds of thermoplastic plates or members that are capable of being sonically welded by this invention. For example, such plates may have one or more channels 42 which may be covered and sealed by the under surface 44 of the plate 26. To accomplish this, one or more ridges 46 and 48, FIGURE 10 may be formed to surround the channel 42, so that such ridges are melted during the sonic welding operation and are formed into sealing and holding bands 50, FIGURES 11 and 12, which seal the sides of the channels 42 and hold the plates 26 and 28 together. However, this is merely illustrative of the many local welds that may be made between the flat members or plates.

If desired, suitable cones 52 may be added to plate 28 to seal together the plates 26 and 28 at places where they are not sealed together by the bands 50. The cones 52 may be substantially of the same cross section as shown for the ridges 46 and 48. This also is merely illustrative of other local welds to be produced.

The following details concerning the plates, channels, etc., are given merely to illustrate and give proper background of this invention.

The plates 26 and 28 may be made of thermoplastic material suitable for the sonic welding operations herein described. Such thermoplastic material may be readily selected by anyone skilled in the art. For example, the plates 26 and 28 may be injection molded, in suitable molds, of Dupont Lexan plastic, or any of the many similar plastic materials available on the market and readily selected by those skilled in the art. The ridges 46 and 48 may be in the order of 60 degrees and 90 degrees, as to the angle between their sides and may have a cross section that forms an equilateral angle.

The plates 26 and 28 may be of any desired size, such as 2" wide along the edges. The channels 42 may be .031" wide and .031" deep, more or less. The outer, higher ridges 48 may be from .066" to .088" high, more or less, and .120" between the two higher ridges 48, more or less. The lower ridges 46 may be from .004" to .006" high, more or less, and may be .082" between the two lower ridge tops. The thickness of the plates 26 and 28 may be, as proportionally shown, with respect to the depth of the channel 42, or they may be of any other proper width, as desired.

The plate 26 may have an upward integral tube 54 which is connected to the channel 42 and enters, and is not pressed, by the opening 56 in the face 24. The plate 26 may have two integral upward hook members 58, which are not to be welded, and are not necessarily material to this invention, and which enter and are not pressed by the upward slots 60 in the face 24. The plate 28 may have two integral downward tubes 62 and 64, which are connected to the channel 42, and which enter and are not pressed by the openings 67 and 69 on the welding support die 40. After the welding operation, the tube 54 may be sealed to the central part of the channel 42, as shown in FIGURE 11, and the channel 42 may be connected to the downward tube 62, as shown in FIGURE 12, and to the tube 64, at the other end of the channel. In this manner air or other fluid may be caused to flow by and between the tubes 54, 62, 64, and any other tubes or openings desired. The channel 42 may have downwardly and upwardly directed openings 66 and 68 at any desired places.

It is to be understood that all of these details in plates 26 and 28 are merely illustrative, to show that such plates may be welded together for any purpose, to produce fluid flow passageways and the like with or without tubes or openings, as desired. Many other different types of plates may be used instead of the ones illustrated.

To produce the desired sonic welding action between the relatively flat members or plates 26 and 28 it is necessary that a relatively large surface area contact be established between the upper surface of plate 26 and face 24 of horn 22 to prevent any welding or melting action between these surfaces. It is also necessary that a main part of the force of the sonic signals from horn 24 be equally distributed and concentrated at the relatively small areas of the ridges 46, 48 and cones 52 between the plates 26 and 28. Also a relatively large, unconcentrated area must be maintained between the raised mainly flat face 70 of the welding support die 40 and the under surface of the plate 28. This is provided by the very slightly raised wide area flat portions 72 and 74 of the face 70. These portions 72 and 74 concentrate the main pressing and welding action at the ridges 46, 48 and cones 52 between the plates 26 and 28.

In order to make these channels, tubes, and the like, substantially sealed between and in the plates, and to join the plates herein disclosed with other plates, to form other assemblies or banks, it is necessary that the face 24 of the horn 22 and the face 70 of the welding support die 40 be parallel to each other during the sonic welding operation within extremely close tolerances. According to this invention, this parallelism is automatically obtained every time that two or more plates are placed between the faces 24 and 70, repeatedly to produce a plurality of identical banks or assemblies quickly, one after the other, without having to carefully shim the welding support die 40 to optain the parallelism. Also, according to this invention, it is possible to quickly change the horn 22, and the supporting die 40, to receive other and different thermoplastic members or plates, and to weld them together to produce different banks or assemblies of flat members or plates, and quickly to repeat production of such different banks or assemblies as will become apparent. According to this invention, the arrangement is such that the faces 24 and 70, or similar faces of other horns and dies, will quickly become parallel automatically during each sonic welding operation. Also the arrangement is such that other different horns, similar to horn 22, and other different support dies, similar to support die 40, may be quickly substituted to change the apparatus 20 to receive and sonically weld other different but somewhat similar banks or assemblies of such flat members or plates.

Thus means are provided automatically to distribute a main part of the force of the mainly lateral sonic signals to the parts of the flat members or plates to be sonically welded together. To this end the base plate 76 is secured tightly on the stand 30 by any suitable means. For example, fastener bars 78 have their ends held respectively on the base plate 76 and on two blocks 80, which rest on the stand 30. These fastener bars are held down by the screws 81, which are screwed into tapped holes in the stand 30. This construction securely holds the base plate 76 on the stand 30.

A rocker plate 82 is part of a holding fixture 83, FIGURE 7, to which the weld support die 40 may be secured, as will be described. The weld support die 40 has holding means to hold one or more of the thermoplastic members or plates 26, 28, etc.

Fluid action support means are provided for holding such rocker plate 82 of the holding fixture 83 in a manner automatically to distribute a main part of the force of the sonic signals from the horn 22 to the parts of the members or plates 26, 28, etc. so that such members or plates are properly sonically welded.

Such fluid action support means may include fluid flow means in the base member or plate 76. Such fluid flow means may be in the form of a plurality of plunger receiving openings 84 connected to a plurality of fluid passageways 86 underneath such openings 84. Some of these passageways 86 have threaded or tapped openings 88 which extend to the side walls 90 of the base plate 76. The openings 88 may be closed by threaded plugs 92. The passageways 86 may be drilled in the plate 76. The rocker plate 82 may be provided with plunger receiving openings 94.

A plurality of fluid actuated plungers or pins 96 may be inserted in the openings 84 and 94 in a manner automatically to level the rocker plate 82 and the entire holding fixture 83 with respect to the face 24 of the horn 22.

Each of the plungers 96 has a relatively thick cylindrical main body 98 and opposite narrower top and bottom cylindrical ends 100 and 102. The top ends 100 are received in openings 94 and the bottom ends 102 are received in openings 84. Flanges 103 at the ends of the main body 98, of the plunger 96 form limiting means to limit the entry of each plunger into the respective openings 84 and 94.

The bottom ends 102 of the plungers 96 have grooves 104 to receive flexible sealing O-rings 106 which yieldingly seal the ends 102 of the plungers in the openings 84 and prevent the flow of fluid upwardly out of the openings 84.

The base plate 76 and rocker plate 82 may be assembled together in any desired manner. For example, the plate 82 may be inverted and then the ends 100 of the plungers 96 may be inserted in the openings 94. Then the plate 76, without any liquid fluid in the passageways 86, may be inverted, and the now upwardly directed ends 102 of the plungers may be inserted in openings 84. Spacers, not shown, may be placed between the plates 76 and 82 to hold the plates substantially parallel and spaced apart substantially the distance shown in FIGURE 3, with the ends 102 of plungers 96 partly out of the openings 84. The plugs 92 previously have been tightly inserted in the threaded openings 88. Then if liquid fluid is to be used, such liquid fluid may be inserted through a now upwardly directed filling opening 108 until all the fluid passageways 86, etc., have been filled with liquid fluid and substantially all the air has been displaced. Then a threaded sealing plug 110 may be inserted and sealed in the opening 108.

The plates 76 and 82 may then be held in spaced relation by any suitabe means, such as by any suitable clamps, etc., until the plates 76 and 82 have been installed on the stand 30 of FIGURE 1.

Any other method of assembling the plates 76 and 82 may be used in addition or alternatively to the above method of assembly.

The plates 76 and 82 may be used with gaseous or liquid fluid as desired. Any one of the plugs 92 may be a fluid pressure supply plug, 92A, having a central fluid flow opening 93, to which a gaseous or liquid fluid pressure supply pipe or a closing plug, not shown, may be connected. The plates 76 and 82, FIGURE 3A, may be provided with limit screws 112 which limit the distance of separation of the two plates 76 and 86 when fluid pressure is applied through opening 93.

Each screw 112 may be loosely received in an opening 114 in plate 82 with an enlarged countersunk screwhead opening 116 to receive the screwhead 118 of screw 114. The screw 112 may be screwed into the tapped opening 120 in plate 76. With this construction the plate 82 is limited in its upward travel by the screwheads 118 when fluid pressure is applied at fluid flow opening 93. However, the plate 82 can yield to the pressure applied by the horn 22 during welding operations.

The rocker plate 82 is provided with tapped openings 122 into which screws 124 of FIGURE 7 may enter. The screws 124 are first inserted in openings 126 in the welding support die 40 of FIGURES 7 and 8 and then are threadedly inserted into the openings 122 of the rocker plate 82. The openings 126 have countersunk portions, not shown, to receive countersunk screwheads of screws 124, not shown, but well known.

The pressure from the horn 22 upon the thermoplastic plates 26 and 28 will be distributed down to the rocker plate 82 and will cause the plungers 96 to move upon the fluid support in openings 84, displacing the fluid on the higher side of the rocker plate 82 and thereby forcing the lower side upward until the pressure is equally distributed to all of the parts of the thermoplastic members or plates to be welded.

In the embodiment of FIGURES 5 and 6 the same effect is achieved using the same previous general configuration in rocker plate 82A, base plate 76A, openings 84A, 94A and plungers 96A. The only difference is that, instead of interconnecting the holes or openings 84A in the base plate 76A, the holes 84A are connected by means of respective conduits 130, 131, 132 and 133 through respective restrictors 134, 135, 136 and 137 to a pressurized source of fluid, such as a pump or compressor, through a common conduit 138 which may be connected by a pipe 139 and valve 140 to such pump or compressor. The valve 140 may be used to connect and disconnect the fluid pressure supply, as desired. A similar pump, compressor and valve may be provided for the pipe to be connected to plug 92A which was previously described.

The plates 82A and 76A may be provided with limit screws similar to limit screws 112 of FIGURE 3A, if desired.

It is thus to be seen that a sonic welding apparatus and method for sonically welding a plurality of thermoplastic members or flat plates have been provided. The signal producing element 22 has a means, or face 24, to press and impart welding sonic signals to one of the flat members or plates, such as 26, of a plurality of flat members or plates 26, 28. A holding fixture is provided, including the support die 40 having means 70 to hold one or more of the flat members or plates 26 and 28, and automatic fluid action support means have been provided automatically to distribute a main part of the force of the sonic signals sonically to weld the parts of the members or flat plates desired to be welded.

A new and useful apparatus and method are thus provided for sonically welding such plurality of thermoplastic members or relatively flat plates.

While the form of the invention now preferred has been disclosed, as required by statute, other forms may be provided, all coming within the scope of the claims which follow.

What is claimed is:

1. A method of sonically welding a plurality of thermoplastic members comprising, pressing a sonic signal producing element against at least one of said thermoplastic members, imparting welding sonic signals to at least one of said members by said pressing sonic signal producing element, holding at least one of said members by a holding fixture, and supporting said fixture with fluid action support means to cause said fixture to align itself relative to said signal producing element with said members therebetween to automatically distribute a main part of the force of said sonic signals to the parts of said flat members to be sonically welded together.

2. A method according to claim 1, with said method welding a plurality of members which are thermoplastic said plates, with said holding fixture having a generally plates, with said signal producing element having a generally flat face to press and impart sonic signals to one of said plates, with said holding fixture having a generally flat face to hold at least one of said plates, and with said force of said sonic signals being automatically distributed to the parts of said plates to be welded together by causing said flat faces to be automatically substantially parallel to each other by said fluid action support means while said plates are being welded together.

3. A method according to claim 1 in which said holding fixture includes a rocker member having means to hold at least a support die member having means to hold one of said thermoplastic members, and said fluid action support means supports said rocker member.

4. A method according to claim 3 in which said rocker member is supported by a plurality of fluid actuated plungers with said plungers being supported by a base member having a plurality of plunger receiving openings receiving said plungers, said base member having a plurality of fluid passageways respectively connected to said plunger receiving openings.

References Cited

UNITED STATES PATENTS

| | | | |
|---|---|---|---|
| 3,146,141 | 8/1964 | Woodland | 156—580 X |
| 3,365,349 | 1/1968 | Daniels | 156—580 |
| 3,419,447 | 12/1968 | Hewitt | 156—580 X |

BENJAMIN R. PADGETT, Primary Examiner

A. J. STEINER, Assistant Examiner

U.S. Cl. X.R.

156—580